United States Patent Office 3,454,439
Patented July 8, 1969

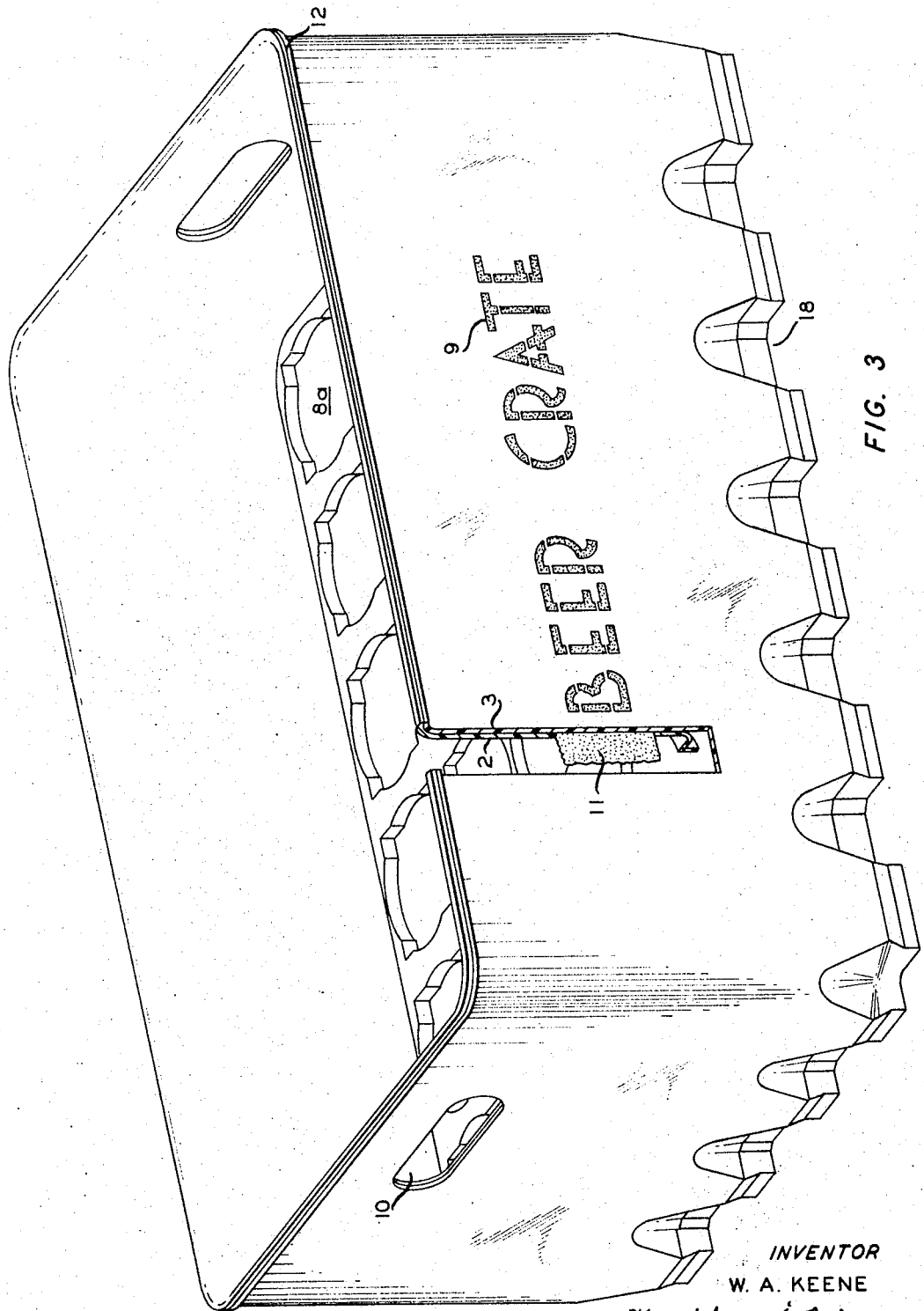

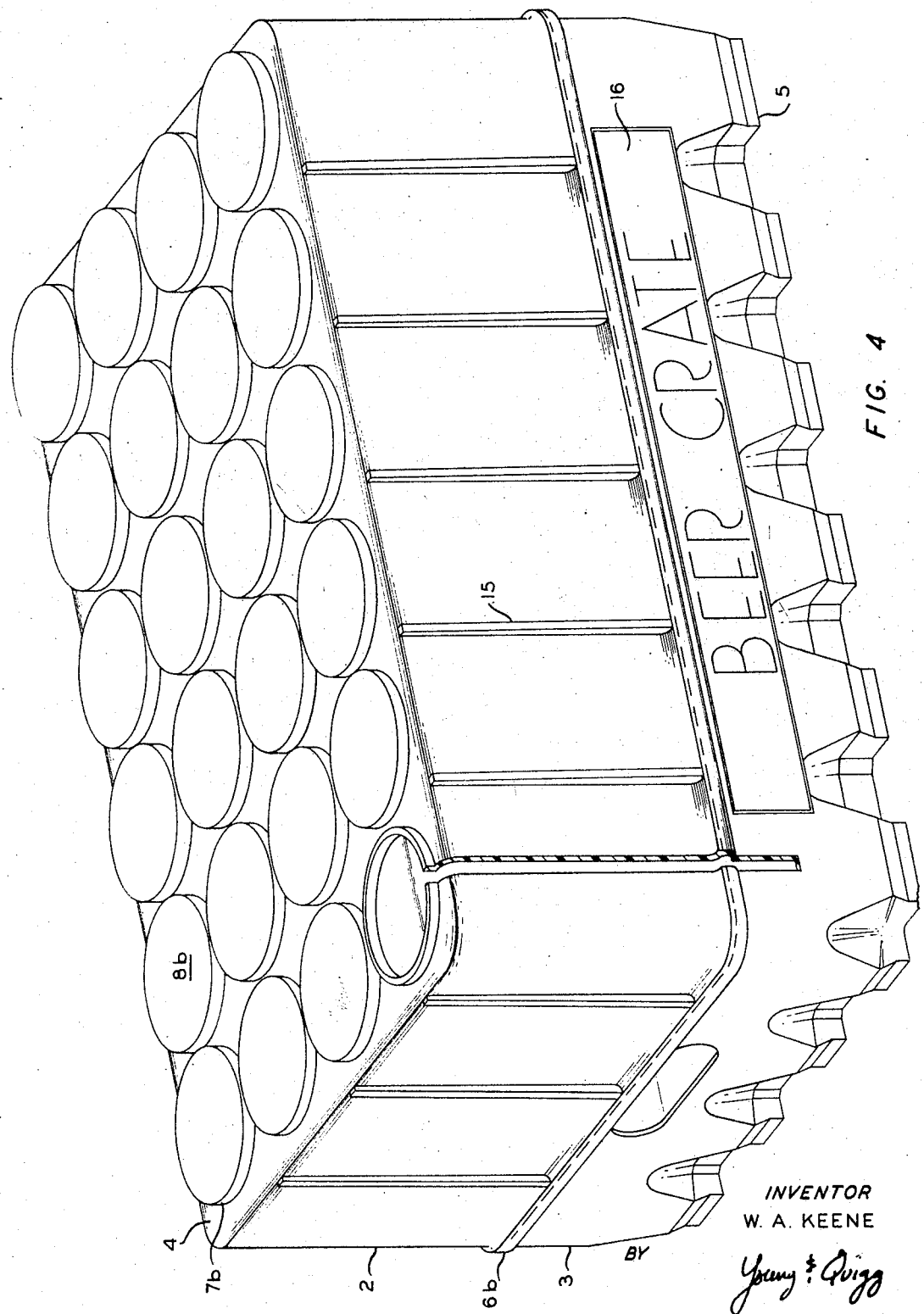

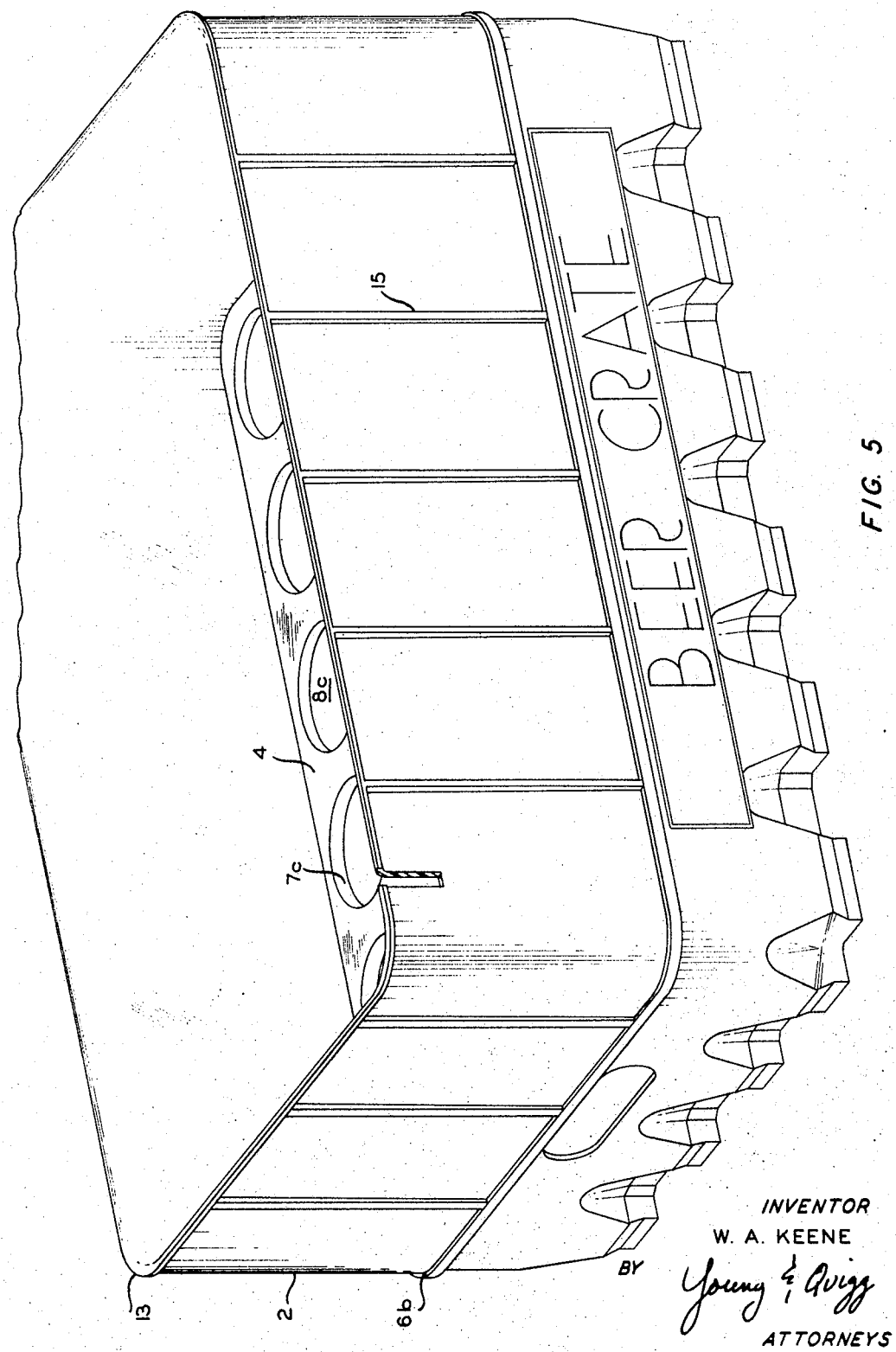

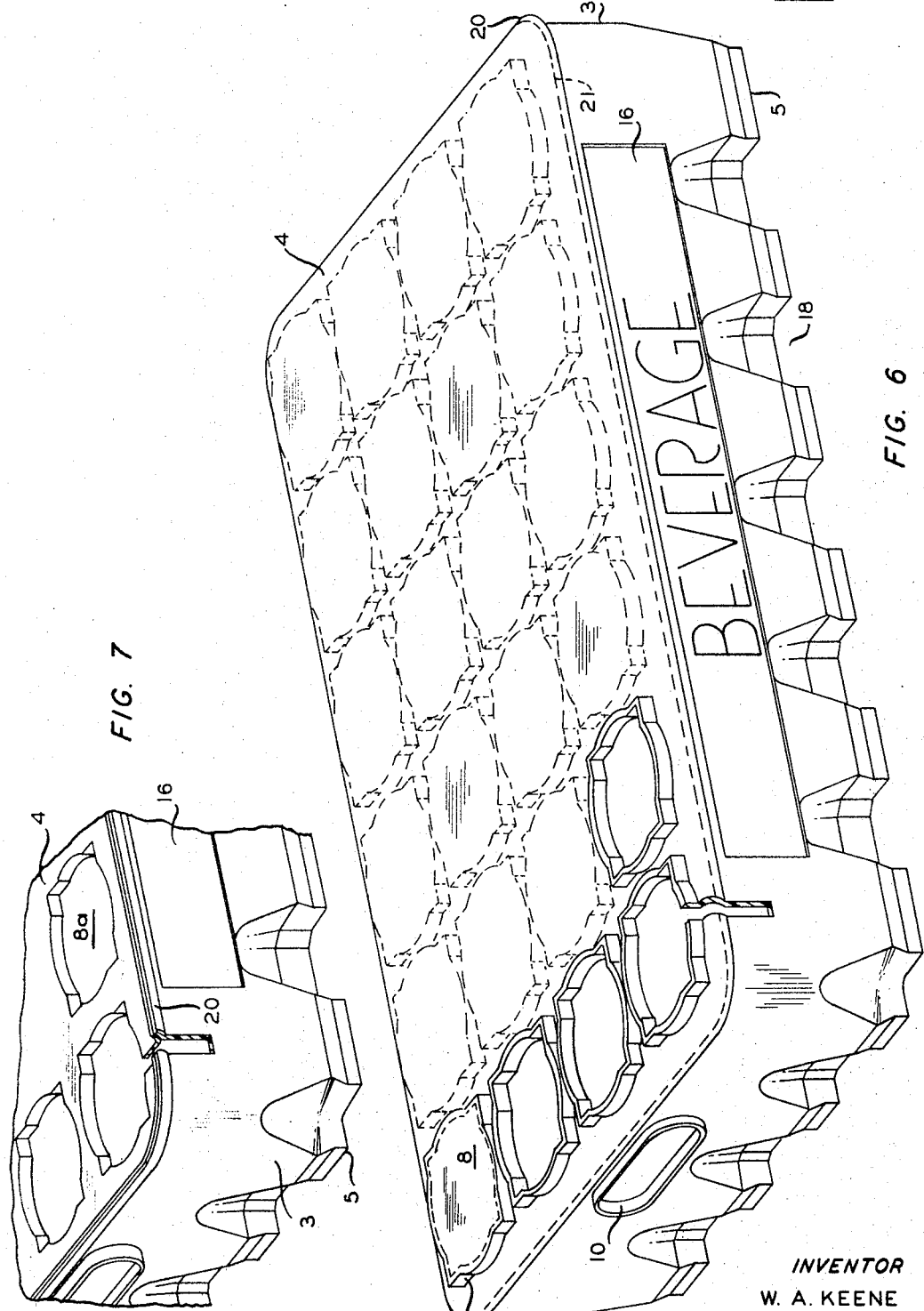

3,454,439
METHOD OF MAKING AN ARTICLE CARRYING CASE
William A. Keene, Bartlesville, Okla., assignor to Phillips Petroleum Company, a corporation of Delaware
Filed Mar. 16, 1966, Ser. No. 534,762
Int. Cl. B29c 17/14, 5/06
U.S. Cl. 156—69          10 Claims

ABSTRACT OF THE DISCLOSURE

A thermoplastic carrying case is formed by blow molding a closed hollow shape having a bottom wall, a continuous side wall, and a top wall which has a plurality of projections. A section containing said top wall is severed from a section containing said bottom wall, the portion of the top wall covering said projections is removed, and the section containing said top wall is inverted and reunited with the section containing the bottom wall so as to form a case having holes in the top to receive the articles to be carried, said holes being defined by downwardly projecting flanges.

---

Figure 1:
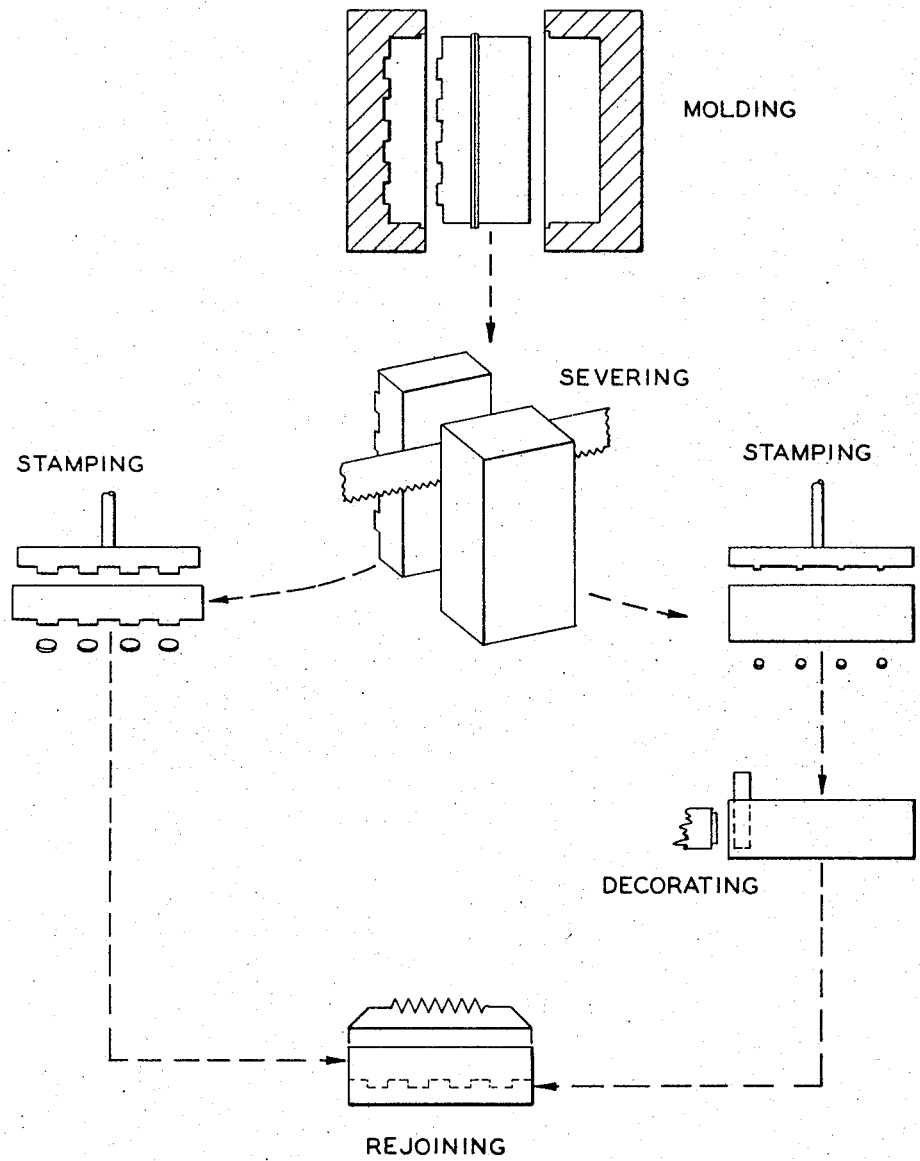

This invention relates to article carriers and to a method of making the same. In one of its aspects, it relates to a method of manufacturing article carriers, said method comprising molding a hollow object having a bottom, a top, and a continuous side wall, at least one upward projection in the top wall, said upward projection having an upwardly extending flange portion defining a closed area of the top wall and having a portion of the top wall across the top of said flange, severing the hollow object into two pieces to form a bottom section and a top section, cutting out and removing portions of the top wall across the top of the flange, uniting the top section and bottom section, the top section being in inverted relationship to the bottom section. In another of its aspects, the invention relates to a method for making an article carrier as hereinbefore described wherein the severing takes place along a line extending around the side walls. In another of its aspects, the invention relates to a method of manufacturing an article carrier as hereinbefore described wherein the bottom wall also has portions removed from it while the article is in two pieces. In another of its aspects, the invention relates to a method for manufacturing an article carrier as hereinbefore described wherein the removed portions of the top wall and the portions of the bottom wall are stamped from the top and bottom walls. In a still further aspect, the invention relates to a method for making an article carrier as hereinbefore described wherein the side wall has an outwardly extending ridge, the side wall is severed along the ridge, after cutting out portions of the top and bottom walls, the bottom wall section and the top wall section are united by welding along the ridge, the top section being in inverted position. In a still further aspect, the invention relates to a method for making an article carrier as hereinbefore described wherein the top wall has a plurality of upward projections which form article positioning means when the portions of the top wall have been removed and the two sections have been welded together. In a still further aspect, the invention relates to a method for making an article carrier as hereinbefore described wherein the upwardly extending flanges define irregular areas. In another of its aspects, the invention relates to a method for manufacturing an article carrier as hereinbefore described wherein the top wall section, when welded to the bottom wall section, extends a substantial distance into the bottom section, thus providing a strengthened side wall area. In another of its aspects, the invention relates to a method for making an article carrier as hereinbefore described wherein the top wall section is welded at a line at which severing has taken place around the side wall. In a still further aspect, the invention relates to a method for making an article carrier as hereinbefore described wherein a portion of the side wall is stamped and the stamped portion is removed while the two sections are separated. In a still further aspect, the invention relates to a method of making an article carrier as hereinbefore described wherein the severing takes place along a line at the junction in the top wall and the side wall.

The invention also relates to a two piece welded together article carrying case comprising a bottom wall, a continuous side wall integrally formed within said bottom wall, an article separating plate within said side walls, an upstanding wall integrally connected at the bottom thereof to said article separating plate and at the top thereof integrally connected to said continuous side wall.

In application Ser. No. 371,866, filed May 8, 1964, Vidal, now U.S. Patent 3,263,009, there is described and claimed a method for manufacturing a hollow one-piece molded article carrier such as that described and claimed in U.S. 3,151,762, wherein a hollow form is molded, the form having inward projections, and the bottom portion of the projections are removed to form article positioning means. The removal of the bottom of the projections has been done with a plurality of rotary saws which simultaneously cut a plurality of holes in each carrier. As can be expected, this device for forming the holes in the carrier is expensive, the equipment is exotic and requires substantial maintenance.

I have now discovered a method of making a carrier similar to that described and claimed in U.S. Patent 3,151,762 in which the use of the circular saws can be avoided. In this method, a hollow preform is made, the preform is cut into a section containing the top wall and the bottom wall of the carrier, and portions of the top and/or bottom wall are stamped out so as to provide article positioning means. The top wall section is then welded to the bottom wall section.

By various aspects of this invention, one or more, or other, of the following objects can be obtained.

It is an object of this invention to provide a new blow molded article carrying case.

It is a further object of this invention to provide a method of making an article carrying case having bottle separating and bottle positioning means whereby holes in the walls can be stamped or punched out.

It is a further object of this invention to provide a method for making an article carrying case having bottle separating and bottle positioning means formed in the top walls wherein holes can be formed without the necessity of using expensive rotary sawing means.

It is a still further object of this invention to provide a method for making a blow molded article carrying case having irregularly shaped holes in the upper portion thereof for positioning bottles therein.

It is a still further object of this invention to provide a method for fabricating a blow molded article carrying case with bottle positioning means in the upper portion thereof with the use of inexpensive, low maintenance equipment and wherein forming of bottle positioning means can be controlled to close tolerances.

Other aspects, objects and the several advantages of this invention are apparent to one skilled in the art from a study of this disclosure, the drawings and the appended claims.

According to the invention, there is provided a novel method for manufacturing hollow article carriers by first forming a molded preform, severing the preform into two sections, one section containing a top wall and one section containing a bottom wall, removing portions of the top wall to form article positioning means, and uniting the separated parts. According to one embodiment of the invention, the portions of the top wall are removed by stamping. According to another embodiment of the invention, the top wall contains a series of upward projections, the top portions of these projections being removed by a stamping operation and the two sections are united by inverting the top wall section and welding the top wall section to the bottom wall section.

Further according to the invention, I have provided a new article carrying case which comprises a bottom wall, side walls, and a bottle separating plate located within the carrier, the plate having a plurality of bottle positioning means. The plate is integrally connected to an upstanding wall portion which is attached to the side walls at the top of the side walls. In one embodiment, both the upstanding wall portion and the side walls of the carrier have an outwardly extending flange, the flange on the upstanding wall portion resting on the side wall flange. According to another embodiment, the side wall has a portion removed for decorative and/or advertising purposes. The removed portion can be a trademark or the like. Colored paper or the like is placed between the side wall and the upstanding wall portion in the area which has been removed from the side wall so that the advertising or design will show through in contrasting colors.

Figure 2:
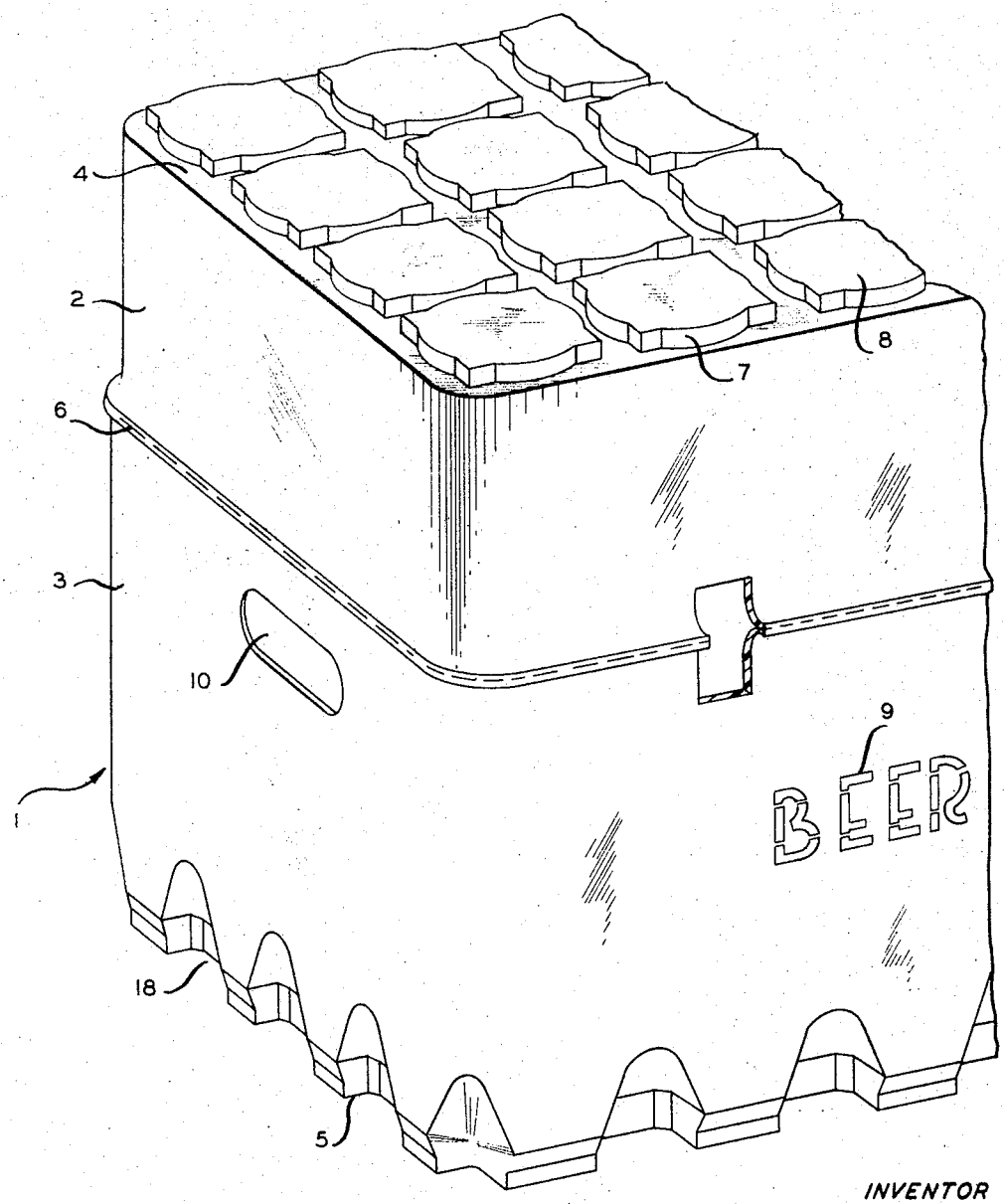

The invention will now be described with reference to the accompanying drawings in which FIGURE 1 is a schematic showing the method according to the invention; FIGURE 2 shows a preform produced according to the invention; FIGURE 3 shows the preform shown in FIGURE 2 after the preform has been severed, stamped and reunited; FIGURE 4 shows another preform partially cut away similar to that shown in FIGURE 2 showing another embodiment of the invention; FIGURE 5 shows a preform seen in FIGURE 4 after the severing, stamping, and reuniting steps; FIGURE 6 shows still another embodiment of the invention in the preform stage; FIGURE 7 shows the same embodiment as seen in FIGURE 6 after the severing, removing, and reuniting steps.

Referring now to FIGURE 1, a hollow parison is blow molded or vacuum molded in a conventional blow molding operation to form a closed, blow article. Preferably, a plurality of projections are formed in one wall of the article. The article is then severed into two sections. Each section has portions of it stamped out. Preferably, the section containing the projections has stamped out the very extremities of the projections. Generally, portions will be stamped from the bottom wall of each section. Alternatively, a portion of the side walls can be stamped to form a trademark or decoration in the side walls. The two severed sections are then rejoined, preferably with the section having the projections inverted and inserted into the interior of the other section. These projections with the extremities removed form article positioning means in an article carrier such as preferably here produced. The uniting can be done by any known method, but the preferred method of uniting the two sections is by welding along the top portion of the side walls.

Referring now to FIGURE 2, a hollow closed blown preform 1 containing upper side walls 2, lower side walls 3, top wall 4 and bottom wall 5 is shown. The side walls preferably contain an outwardly extending ridge 6. Also, preferably the top wall contains an upwardly extending flange 7 covered by top wall portion 8. In making the container, the upper section 2 will be severed from the lower section 3 by cutting along ridge 6. After the two sections are severed, top wall portions 8 can be removed by simple stamping operations or the like, this being possible by positioning a supporting surface under top wall 4 and applying a large force through a die member having the shape of top wall portion 8. Additionally, portions of the bottom wall can be removed for drain holes and the like. Portions of the side wall such as 9 can be removed for advertising purposes.

Referring now to FIGURE 3, the severed and stamped portions of the article shown in FIGURE 2 have been assembled. As can be seen, the top portion has been inverted and placed into the lower portion. It is obvious that the shape of the upper side walls 2 must be smaller in cross section than lower side walls 3, or the nesting as shown in FIGURE 3 will not occur. Preferably, the ridge in the upper side walls 2 will rest on the ridge in lower side walls 3 and the two pieces can be joined at 12 by welding. Article positioning means 18 can be formed in the bottom of the container during the molding operation.

According to one embodiment, a colored, thin walled plastic 11 is placed between lower side wall 3 and upper side wall 2 in FIGURE 3 in the area of cut-out 9. This allows a contrasting design to be inexpensively placed on the side wall of the container.

The holes 8a left by the removal of top wall portions 8 provide for article positioning and article separating means. As is obvious from the drawing, this embodiment is directed to a bottle carrier in which bottles will be positioned and separated within the carrier. Other features such as handle holes 10 can be provided for easy handling.

The double walled carrier is an improved carrier since the upper portions of the carrier are double thicknesses providing for added strength.

Referring now to FIGURE 4, there is provided a blow molded preform having an upper side wall section 2 and a lower side wall section 3. The upper side wall section 2 is slightly indented near the ridge 6b but extends outwardly near the top wall at 4 to a diameter approximately that of side wall 3. Upper side wall 2 has a plurality of vertical strengthening ribs 15 of thickened material. Side wall 3 contains a labelling panel 16 in which advertising can be placed by well known silk screen operations and the like. Top wall 4 contains irregularly shaped projections 7b having top portions 8b. The crate is severed along a line around ridge 6b. Top portions 8b are removed by stamping and the like, the top section is inverted and united with bottom side wall 3.

As can be seen from FIGURE 5, the top portion of side wall 2 fits into the groove formed by ridge 6b when the top portion has been inverted. This inversion leaves a ridge 13 around the top of the container. Strengthening ribs 15 rest against ridge 6b and assist in positioning the top wall 2 in the groove formed by ridge 6b. The two sections can be attached by welding around ridge 6b. The holes 8c formed by removing portions 8b form article positioning means within the carrier. Top wall 4 provides the article separating means within the carrier. The ridge 13 around the completed carrier shown in FIGURE 5 provides a means by which a cover can be attached. A suitable cover would have a downwardly extending flange and an inwardly extending portion to engage ridge 13. Many well known types of covers could be used, including those which can be shrunk fit onto the carrier.

Referring now to FIGURE 6, there is shown a blown article similar to those seen in FIGURES 2 and 4, except that the side wall portion is much shorter. In this case, there is formed in the top of side wall 3 an outwardly extending flange 20. In this embodiment, the top wall 4 is severed from the rest of the article by cutting along line 21. Portions 8 are stamped from the top section after severing, thereby forming article positioning means in top wall 4. As hereinbefore mentioned, the portions 8 can be removed by a simple stamping operation whereby irregular shapes can be removed with a minimum of expense and with close tolerances. After the stamping operation, top wall 4 is inverted and united to the bottom portion of the carrier as shown in FIGURE 7. The two sections can be united by welding along flange 20. Holes 8a provide the article positioning means in this carrier.

The carriers of the invention can be made from any suitable molding material such as the thermoplastic polyethylene, polypropylene, polyvinylchloride, and polystyrene. A suitable thermoplastic polyethylene is described and claimed in U.S. 2,825,721, Hogan and Banks.

The carriers made according to the invention have shown bottle positioning means formed in the bottom of the container during the blowing operation. However, it is within the scope of the invention to mold a carrier having a flat bottom and insert divider means into the carrier after the top portion has been severed from the bottom portion and before reuniting the two.

The carriers made according to the invention have been described with upward projections in the top wall of the preform. However, it is within the scope of the invention to provide a flat top wall without projections, forming article positioning means by merely stamping out portions of the top wall after the severing operation.

The top of the finished articles can be so shaped so as to aid in stacking of containers. In other words, the bottom of the crate shown in FIGURE 3 for example would engage the outwardly extending flange at 12 in the finished container.

The invention provides the additional advantage of less expensive shipping of the carriers. The severed carriers, after having been stamped can be nested in separate stacks and assembled at the destination, thus avoiding the loss of wasted space between the top and bottom walls of the finished carriers.

As used herein, the term "welding" refers to continuous welding, spot welding, strip welding and includes normal thermoplastic heat sealing operations wherein one thermoplastic art is fused to another thermoplastic part.

Reasonable variation and modification are possible within the scope of the foregoing disclosure and the drawings, the essence of which is that there has been provided a novel method of making an article carrier by molding a hollow article having a top wall, bottom wall and continuous side wall, severing a portion of the hollow article into a section containing the top wall and in a section containing the bottom wall, removing at least one portion of the top wall to form at least one article positioning means and reuniting the top wall and bottom wall portions to form an article carrying case; and there has been provided a novel carrying case comprising a bottom wall and side walls and an integral article positioning plate having article positioning means, the plate being attached to an upstanding side wall which is in turn attached to the top portion of the side wall.

I claim:

1. A method of making a thermoplastic carrying case comprising: molding a closed hollow shape having a bottom wall, a continuous side wall, and a top wall, said top wall having a plurality of projections defined by flanges extending upwardly from said top wall and portions of said top wall which cover said projections; severing a section containing said top wall from a section containing said bottom wall; removing said portions covering said projections after said severing step thus leaving a plurality of holes in said top wall; inverting said top wall section so that said flanges surrounding said holes extend downwardly; and reuniting said section containing said top wall with said section containing said bottom wall by joining in an area of said section containing said bottom wall where said section containing said top wall was severed from said section containing said bottom wall.

2. A method according to claim 1 wherein said portions covering said projections are removed by stamping.

3. A method according to claim 2 wherein portions of said bottom wall are removed by stamping during the time said section containing said top wall and said section containing said bottom wall are separated.

4. A method according to claim 1 wherein said side wall has an outwardly extending ridge around it, said ridge extending outwardly by about one thickness of material; said severing comprising cutting along a line on said ridge in such a manner that an outwardly extending groove results in the interior top portion of a side wall of said section containing said bottom wall; said reuniting step comprising placing a portion of said section containing said top wall which portion is adjacent said top wall in said groove, said portion of said side wall so placed in said groove being shaped so as to be nestable in said groove when said section containing said top wall is inverted; and welding along said groove.

5. A method according to claim 1 wherein said upwardly extending flanges define an irregularly shaped area.

6. A method according to claim 1 wherein said section containing said top wall is severed from said section containing said bottom wall along a line at the junction of said side wall and said top wall.

7. A method according to claim 1 wherein divider means are inserted into said section containing said bottom wall before said uniting step.

8. A method according to claim 1 wherein upwardly projecting article position means are formed in said bottom wall of said shape during said molding.

9. A method according to claim 1 wherein said side wall contains an outwardly extending ridge, said side wall above said ridge being smaller in diameter than said side wall below said ridge; said severing comprising cutting along a line on said ridge whereby a portion of said ridge remains on said section containing said top wall and a portion of said ridge remains on said section containing said bottom wall; said reuniting step comprising placing said section containing said top wall in said section containing said bottom wall in inverted position so that said portion of said ridge remaining on said section containing said top wall contacts said portion of said ridge remaining on said section containing said bottom wall; and welding said section containing said top wall to said section containing said bottom wall along said ridge.

10. A method according to claim 9 wherein a portion of a side wall section below said ridge has a portion stamped out of it when said carrier is in severed condition, and a contrasting colored material is positioned against the interior of said side wall over said stamped out area.

References Cited

UNITED STATES PATENTS

| 751,307 | 2/1904 | Lake | 161—6 |
| 2,410,251 | 10/1946 | Taurman | 220—21 |
| 2,619,251 | 11/1952 | Schmidt | 220—21 |
| 3,272,378 | 9/1966 | Weber | 220—21 |

FOREIGN PATENTS

| 625,187 | 5/1963 | Belgium. |

EARL M. BERGERT, *Primary Examiner.*

R. A. KILLWORTH, *Assistant Examiner.*

U.S. Cl. X.R.

156—258, 264; 264—152